US011519166B2

(12) United States Patent
Miller et al.

(10) Patent No.: US 11,519,166 B2
(45) Date of Patent: Dec. 6, 2022

(54) GUIDANCE APPARATUS FOR ASSEMBLY OF CONSTRUCTION PANELS

(71) Applicant: Miller Dowel Company, Wilmette, IL (US)

(72) Inventors: Michael R. Miller, Winnetka, IL (US); Robert Daly, Elk Grove Village, IL (US)

(73) Assignee: MILLER DOWEL COMPANY, Wilmette, IL (US)

( * ) Notice: Subject to any disclaimer, the term of this patent is extended or adjusted under 35 U.S.C. 154(b) by 120 days.

(21) Appl. No.: 16/908,349

(22) Filed: Jun. 22, 2020

(65) Prior Publication Data

US 2020/0399892 A1 Dec. 24, 2020

Related U.S. Application Data

(60) Provisional application No. 62/865,488, filed on Jun. 24, 2019.

(51) Int. Cl.
*E04B 1/48* (2006.01)
*E04B 1/61* (2006.01)
*E04G 21/18* (2006.01)

(52) U.S. Cl.
CPC .................. *E04B 1/48* (2013.01); *E04B 1/61* (2013.01); *E04G 21/1841* (2013.01)

(58) Field of Classification Search
CPC ......... E04B 1/48; E04B 1/61; E04G 21/1841; F16B 19/02; F16B 12/24; F16B 13/00;
(Continued)

(56) References Cited

U.S. PATENT DOCUMENTS

| 100,055 A | 2/1870 | Montgomery |
| 332,308 A | 12/1885 | Valentine |

(Continued)

FOREIGN PATENT DOCUMENTS

| EP | 1 396 462 A2 | 3/2004 |
| WO | 93/02263 | 2/1993 |

(Continued)

OTHER PUBLICATIONS

Search Report and Written Opinion of the International Searching Authority for corresponding PCT application PCT/US2020/037761 dated Aug. 20, 2020.

(Continued)

*Primary Examiner* — Ryan D Kwiecinski
(74) *Attorney, Agent, or Firm* — Husch Blackwell LLP (57) ABSTRACT

An apparatus guides first and second assembly components into a predetermined configuration, each assembly component including an opening. When the assembly components are aligned into the predetermined configuration, their openings align to define a cavity for receiving a stepped dowel to fasten the components together. The guiding apparatus includes a stepped dowel member having successively-smaller dowel sections, and a collar member floating around the base of the stepped dowel member. The stepped dowel member tip can be passed through the first assembly component opening and inserted into the second assembly component opening, drawing the components into the pre-determined configuration. When the components are aligned into the predetermined configuration, the collar member engages the first assembly component opening and the stepped dowel member engages the second assembly component opening. The guiding apparatus can be disengaged, freeing the dowel-receiving cavity to accept a stepped dowel for fastening the assembly components together.

13 Claims, 3 Drawing Sheets

(58) Field of Classification Search
CPC ........... F16B 13/04; B65D 2519/00572; Y10T 403/55; Y10T 403/75
See application file for complete search history.

(56) References Cited

U.S. PATENT DOCUMENTS

| | | | |
|---|---|---|---|
| 569,235 A | 10/1896 | Rockwell | |
| 876,985 A | 1/1908 | Malacon | |
| RE13,915 E | 5/1915 | Evans | |
| 1,229,565 A | 6/1917 | Ahlgren | |
| 2,621,006 A | 7/1948 | Norrefeldt et al. | |
| 2,667,795 A | 2/1954 | Bowen | |
| 2,817,620 A | 12/1957 | Golick et al. | |
| 2,984,130 A * | 5/1961 | Lentz | B23B 27/06 408/232 |
| 3,016,222 A | 1/1962 | Arthur | |
| 3,104,430 A | 9/1963 | Badali | |
| 3,153,283 A | 10/1964 | Weissman | |
| 3,204,583 A | 9/1965 | Nicholson | |
| 3,221,458 A | 12/1965 | Lucas | |
| 3,527,486 A | 9/1970 | Gamp | |
| 3,575,520 A | 4/1971 | Halpern | |
| 3,582,126 A | 6/1971 | Bladholm | |
| 3,635,573 A | 1/1972 | Halpern | |
| 3,756,635 A | 9/1973 | Beers | |
| 3,850,054 A * | 11/1974 | Weissman | A61C 1/144 433/165 |
| 3,883,258 A | 5/1975 | Hewson | |
| 4,093,389 A | 6/1978 | Wibrow | |
| 4,128,356 A | 12/1978 | Carlisle | |
| 4,137,115 A | 1/1979 | Lambert | |
| 4,340,327 A | 7/1982 | Martins | |
| 4,424,753 A | 1/1984 | Eatherton | |
| 4,518,291 A | 5/1985 | Lang et al. | |
| 4,536,044 A | 8/1985 | Ziegelheim et al. | |
| 4,639,197 A | 1/1987 | Tonare et al. | |
| 4,793,745 A | 12/1988 | Ashbaugh et al. | |
| 4,815,902 A | 3/1989 | Durfee, Jr. | |
| 4,884,571 A | 12/1989 | Baker | |
| 5,100,162 A | 3/1992 | Lo | |
| 5,131,783 A | 7/1992 | Astl | |
| 5,232,302 A * | 8/1993 | Wagner | F16B 13/04 411/510 |
| 5,265,988 A | 11/1993 | Schmigalla et al. | |
| 5,326,196 A * | 7/1994 | Noll | B23B 31/005 408/56 |
| 5,333,555 A | 8/1994 | McPhee | |
| 5,458,069 A | 10/1995 | Stolzman | |
| 5,529,424 A | 6/1996 | Neubert et al. | |
| D371,302 S | 7/1996 | Spirer | |
| 5,584,951 A | 12/1996 | Macfarland | |
| 5,673,629 A | 10/1997 | Ginnow | |
| 5,685,234 A | 11/1997 | Grigsby et al. | |
| 5,768,845 A | 6/1998 | Beaulieu et al. | |
| 5,771,650 A | 6/1998 | Williams et al. | |
| 5,807,015 A | 9/1998 | Goto | |
| D412,816 S * | 8/1999 | Thingvold | D8/1 |
| 5,960,721 A | 10/1999 | Huetteman et al. | |
| 5,967,056 A | 10/1999 | Plante | |
| D426,766 S | 6/2000 | Burchall et al. | |
| 6,267,527 B1 * | 7/2001 | Miller | F16B 12/24 411/530 |
| D456,700 S * | 5/2002 | Miller | D8/382 |
| D484,781 S * | 1/2004 | Miller | D8/382 |
| 6,814,287 B1 | 11/2004 | Chang et al. | |
| 6,871,681 B2 * | 3/2005 | Miller | F16B 11/008 144/353 |
| D615,569 S * | 5/2010 | Greenleaf | D15/128 |
| 7,856,933 B2 * | 12/2010 | Miller | B65D 19/0095 108/51.11 |
| 8,172,635 B2 * | 5/2012 | Lin | H01J 27/024 403/80 |
| 8,511,033 B2 * | 8/2013 | Kumakawa | F16B 9/058 52/655.1 |
| 8,622,666 B2 * | 1/2014 | Kozak | B27G 15/00 408/224 |
| 9,731,358 B2 * | 8/2017 | Allen | B23B 51/009 |
| D812,228 S * | 3/2018 | Miller | D24/155 |
| 10,005,586 B1 * | 6/2018 | Miller | B65D 19/0095 |
| 10,935,064 B2 * | 3/2021 | Miller | F16B 13/04 |
| 11,174,133 B2 * | 11/2021 | Miller | E04G 27/00 |
| 2003/0089771 A1 | 5/2003 | Cybulski et al. | |
| 2004/0099339 A1 | 5/2004 | Miller | |
| 2006/0054064 A1 * | 3/2006 | Miller | B65D 19/0095 108/56.1 |
| 2008/0115699 A1 * | 5/2008 | Miller | B65D 19/0095 108/56.1 |
| 2008/0245030 A1 | 10/2008 | Sieber | |
| 2009/0149285 A1 * | 6/2009 | Miller | A63B 59/52 144/330 |
| 2009/0255605 A1 | 10/2009 | Filion et al. | |
| 2013/0020819 A1 | 1/2013 | Alba | |
| 2013/0289629 A1 * | 10/2013 | Miller | A61B 17/68 606/300 |
| 2016/0202292 A1 * | 7/2016 | West | G01R 1/067 324/750.25 |
| 2020/0399892 A1 * | 12/2020 | Miller | E04G 21/1841 |
| 2021/0230857 A1 * | 7/2021 | Miller | E04C 3/36 |

FOREIGN PATENT DOCUMENTS

| | | | |
|---|---|---|---|
| WO | WO-2011012096 A1 * | 2/2011 | ........... E04B 1/7633 |
| WO | 2019/149695 A1 | 8/2019 | |

OTHER PUBLICATIONS

Search Report and Written Opinion of the International Searching Authority for corresponding PCT application PCT/US2020/029891 dated Jul. 9, 2020.
Udo Schmidt, Predicting Wood Movement, Woodcraft Magazine, Issue 13, pp. 76-76, 100206, https://www.woodcraft.com/media/W1siZilsljlwMTgvMTAvMjMvMTAvMDYvNDQvNDI5L1dvb2R TZW5zZTIucGRmIl1d/WoodSense2.pdf?sha=169d863a947fc7cb.
Nick Engler, Wood MOvement, Workshop Companion, 2009, http://workshopcompanion.com/KnowHow/Design/Nature_of_Wood/2_Wood_Movement/2_Wood-Movement.htm.
Jeff Lefkowitz, Grain Orientation and Wood Movement, Part 1: Chairmaking Techniques, 101112, http://www.jefflefkowitzchairmaker.com/chairmakers-journal/grain-orientation-and-wood-movement-part-1.
International Search Report and Written Opinion for International Application No. PCT/US20/38999 dated Oct. 9, 2020, 10 pages.

* cited by examiner

GUIDANCE APPARATUS FOR ASSEMBLY OF CONSTRUCTION PANELS

CROSS-REFERENCE TO RELATED APPLICATION

This application claims the benefit of the filing date of U.S. Provisional Application Ser. No. 62/865,488 filed Jun. 24, 2019, entitled, "Guidance Apparatus For Assembly Of Construction Panels" which is hereby incorporated by reference as if fully set forth herein.

FIELD

The invention relates to an apparatus for guiding assembly components into a predetermined configuration suitable for a fastening mechanism to fix the configured components together into the predetermined assembled configuration. The invention also relates to a method of using a guidance apparatus to align assembly components for receiving fastening mechanisms to fix the components into their predetermined assembled configuration.

The invention particularly relates to guiding prefabricated wall components into an predetermined configuration relative to floor or ceiling components, such that the components form dowel-receiving cavities when placed in the aligned configuration, the dowel-receiving cavities for receiving stepped dowels.

BACKGROUND OF THE INVENTION

To assemble a multi-component assembly, individual components must be aligned into specific positions with respect to other components, in order to allow fastening mechanisms to fix the components together in the desired, assembled configuration for the multi-component assembly. This can be difficult when especially the components are large or heavy, or when the components must be manipulated into a precise configuration. Assembly is problematic where the alignment positions are not easily seen or detected by the individual putting together the assembly. Such assembly can be particularly difficult where there is limited space in which to manipulate the components during the assembly process.

For example, prefabricated multi-panel wall assemblies can be assembled from multiple smaller wall panel components, and then secured onto a floor component and secured to a ceiling component. Such components are often large and weighty, and the fastening mechanisms for joining them often require that the components be arranged with great precision to allow the fastening mechanisms to fix the components together. Often, such components are prefabricated to include structures for engaging the fastening mechanisms, and those structures must be sufficiently aligned to accept the mechanism that fastens them together.

Compared to the assembly structures, the fastening mechanisms can have a much smaller relative size, which can make it difficult align them together, especially where there is little room for error in alignment. During the assembly process, the components themselves can block the assembly person aligning the components from using his senses to determine if the components are properly positioned.

There is a need for a mechanism for guiding two or more components into an assembly system. For example, there is a need for a device for aligning prefabricated wall system components into the configuration required to enable fastening mechanisms to engage and fix the components together. There is a particular need for a guiding mechanism that can be deployed to quickly and accurately align the prefabricated components of such wall systems, and other assembly systems, together.

There is a particular need for a guidance mechanism that can be quickly and easily removed from the assembly system after alignment of the wall system components is complete, leaving the components aligned in the assembly configurations with respect to each other. There is a need for a transient guiding apparatus that can align the components precisely and then be removed without disturbing the position of the aligned components.

There is a particular need for a guiding apparatus that can be employed while the assembly components are in transit, to guide the assembly pieces into optimum configurations for fastening them together. It would be useful to have a guiding apparatus that can be deployed before the assembly pieces physically contact each other, especially after one of the pieces has been lifted and before it has been deposited to its destination. At such a time, when the weight of a component is supported by a transport device, relatively little force would be required for precise alignment of the component.

There is also a need for an apparatus that can be used to transiently manipulate the position of such large components that can be used in concert with other devices that have the power or size to accomplish the handling of the large components. There is a need for a transport apparatus that can form a temporary engagement with the large assembly components, accomplish the positioning of the components, and then be disengaged from the assembly components without damaging, altering, or changing the relative positions of the components.

There is a need for such a transport apparatus that is portable and usable in limited spaces, having a structure that enables it to transiently bear the weight of assembly components having a much greater comparative size or weight. There is also a need for a transport apparatus that is made of a minimal number of components, that can be quickly and readily used and removed, that can position the assembly components quickly and readily, and then be extracted from the aligned components so as to facilitate the engagement of fastening mechanisms.

There is a need for a method of using common construction components or elements to effect the alignment of the assembly components into predetermined configurations, combining them in such a way as to create a transport apparatus for moving large or heavy assembly components into desired configurations, to facilitate the engagement of the fastening mechanisms that will fix the components into the assembled configuration.

BRIEF DESCRIPTION OF THE INVENTION

A major aspect of the invention relate to a device or apparatus for guiding individual components of an assembly system into alignment with other components of the assembly system, to align the components into specific predetermined positions with respect to each other, in order to allow fastening mechanisms to fix the components together in the desired, assembled configuration for the multi-component assembly.

An embodiment of the invention relates to an apparatus for guiding first and second assembly components into an assembled configuration, the guidance apparatus comprising: i) a dowel member having: a base portion; a tip portion;

and a plurality of dowel sections, each successive dowel section having a cross-section smaller than a cross-section of a preceding dowel section; and ii) a collar member, the collar member disposed around and slidingly engaging the base portion of the dowel member; such that the first assembly component includes a channel and the second assembly component includes a bore, such that when the first and second assembly components are aligned in the assembled configuration, the channel and the bore define a cavity configured for receiving a stepped dowel; and such that the assembly components are positioned into the predetermined configuration by engaging: i) the collar member to the bore of the first assembly component and ii) the stepped dowel member to the bore of the second assembly component.

Another aspect of the invention relates to a guidance apparatus includes a flange, the flange having a cross-section greater than a cross-section of the collar member.

Another aspect of the invention relates to a guidance apparatus includes the base portion of the dowel member comprising a member for providing a grip for a manual tool.

Another aspect of the invention relates to a guidance apparatus includes the guidance apparatus comprising a metallic material.

Additional aspects relate to a guidance apparatus for aligning assembly components, such that the assembly components define structures for engaging a fastening mechanism for securing the assembly components into the assembled configuration.

Some aspects relate to a guidance apparatus for aligning assembly components that define a dowel-receiving cavity. Additional aspects relate to a guidance apparatus that define a cavity for receiving a stepped dowel.

An aspect relates to the guidance apparatus for assembling components of a wall system, for aligning wall panels or wall panel assemblies to components related to the floor or ceiling of the wall system.

Another major aspect of the invention relates to methods of using the guidance apparatus to align components of an assembly system with respect to each other into the aligned, predetermined configuration.

An embodiment of the invention relates to method for assembling a wall system comprising: providing a wall panel, the wall panel having a bore on a top surface, the wall panel bore for engaging a stepped dowel; providing a ceiling member, the ceiling member having upper and lower opposing elongated longitudinal surfaces, and a dowel cavity extending through the longitudinal surfaces; positioning a guidance member to engage the ceiling member cavity, the guidance member having a plurality of dowel sections, each successive dowel section having a cross-section smaller than a cross-section of a preceding dowel section; positioning a guidance member to engage the wall panel bore, one end of the guidance member engaging the ceiling member cavity, and the other end of the guidance member engaging the wall panel bore; positioning the ceiling member and the wall panel in a predetermined orientation; removing the guidance apparatus; and inserting the stepped dowel into a dowel-receiving cavity defined by the aligned ceiling member cavity and wall panel bore, to thereby connect the aligned ceiling member to the aligned wall panel and assemble the wall system.

Another aspect of the invention relates to a method including applying an adhesive material to the dowel-receiving cavity or the dowel such that the adhesive material is ultimately disposed in the dowel-receiving cavity.

An additional aspect of the invention relates to a method where the guidance apparatus comprising a collar member surrounding and slidingly engaging the dowel sections, the collar member having a cross-section larger than a cross-section of dowel sections.

Another aspect of the invention relates to a method where a base portion of the guidance apparatus comprises a member for providing a grip for a manual tool.

Yet another aspect of the invention relates to a method where the guidance member including a collar member slidingly engaging a first dowel section, the collar member having a cross-section larger than a cross-section of the first dowel section.

Another embodiment of the invention relates to an apparatus for guiding first and second assembly components into an predetermined configuration, the guidance apparatus comprising: i) a stepped dowel member having a plurality of dowel sections, each successive dowel section having a cross-section smaller than a cross-section of a preceding dowel section; and ii) a collar member surrounding and slidingly engaging a first dowel section; such that each assembly component includes a stepped opening, such that when the assembly components are positioned in the assembled configuration the aligned stepped openings define a cavity for receiving a stepped dowel; and such that the assembly components are positioned into the assembled configuration by the stepped dowel member passing through the stepped opening of the first assembly component and into the stepped opening of the second assembly component, such that the collar member engages the first assembly component stepped opening and the stepped dowel member engages the second assembly component stepped opening.

Another aspect of the invention relates to the guidance apparatus having the stepped dowel member comprising a sensor.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE INVENTION

While this invention is susceptible of embodiments in many different forms, there are shown in the drawings and will be described in detail herein specific embodiments with the understanding that the present disclosure is an exemplification of the principles of the invention. It is not intended to limit the invention to the specific illustrated embodiments.

The features disclosed herein in the description, drawings, and claims can be significant, both individually and in any desired combinations, for the operation of the invention in its various embodiments. Features from one embodiment can be used in other embodiments of the invention.

Figures 1A, 1B:
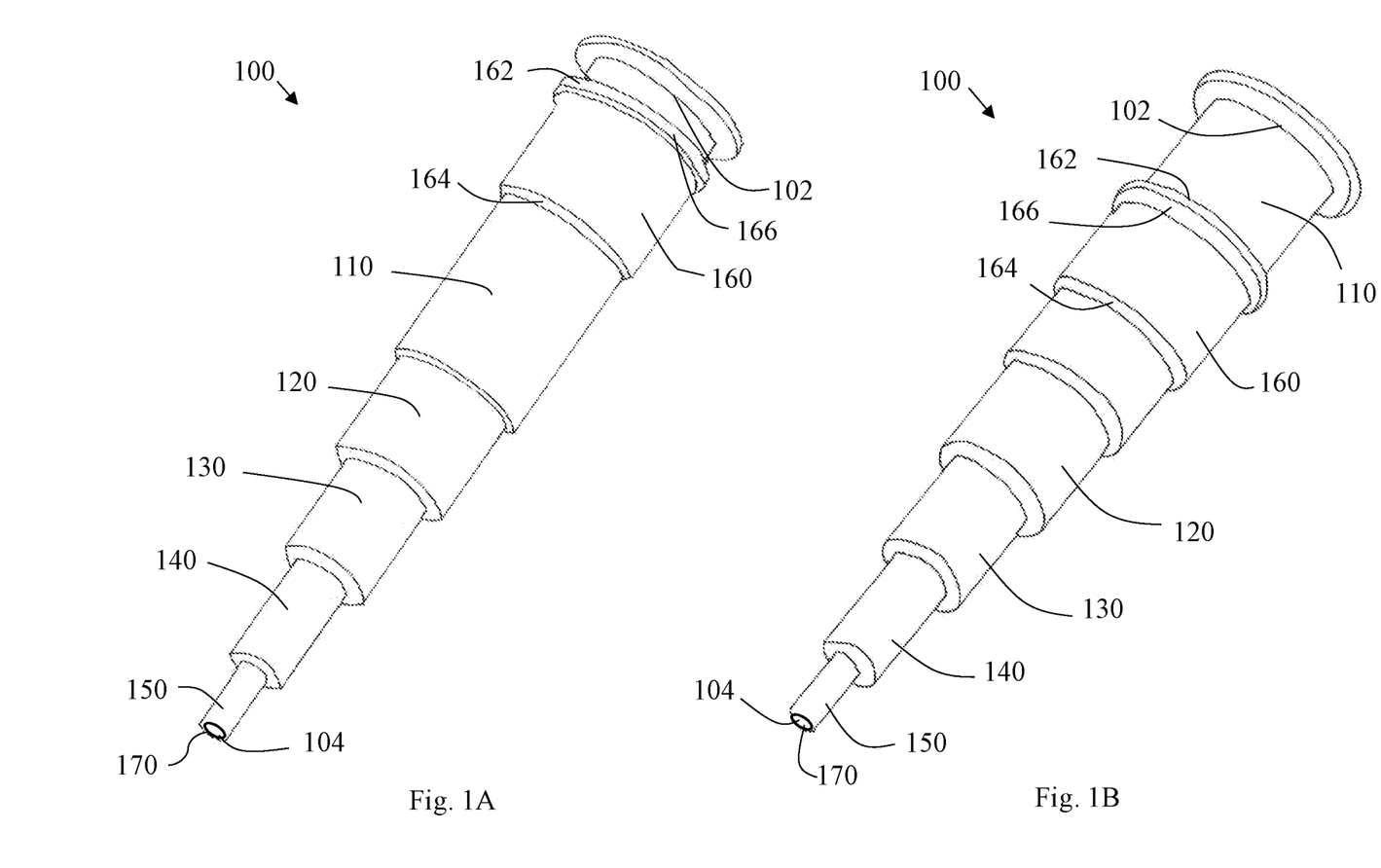
FIGS. 1A and 1B show side views of an embodiment of an apparatus for guiding and aligning assembly components, with a movable collar member in different positions.
Figure 2:
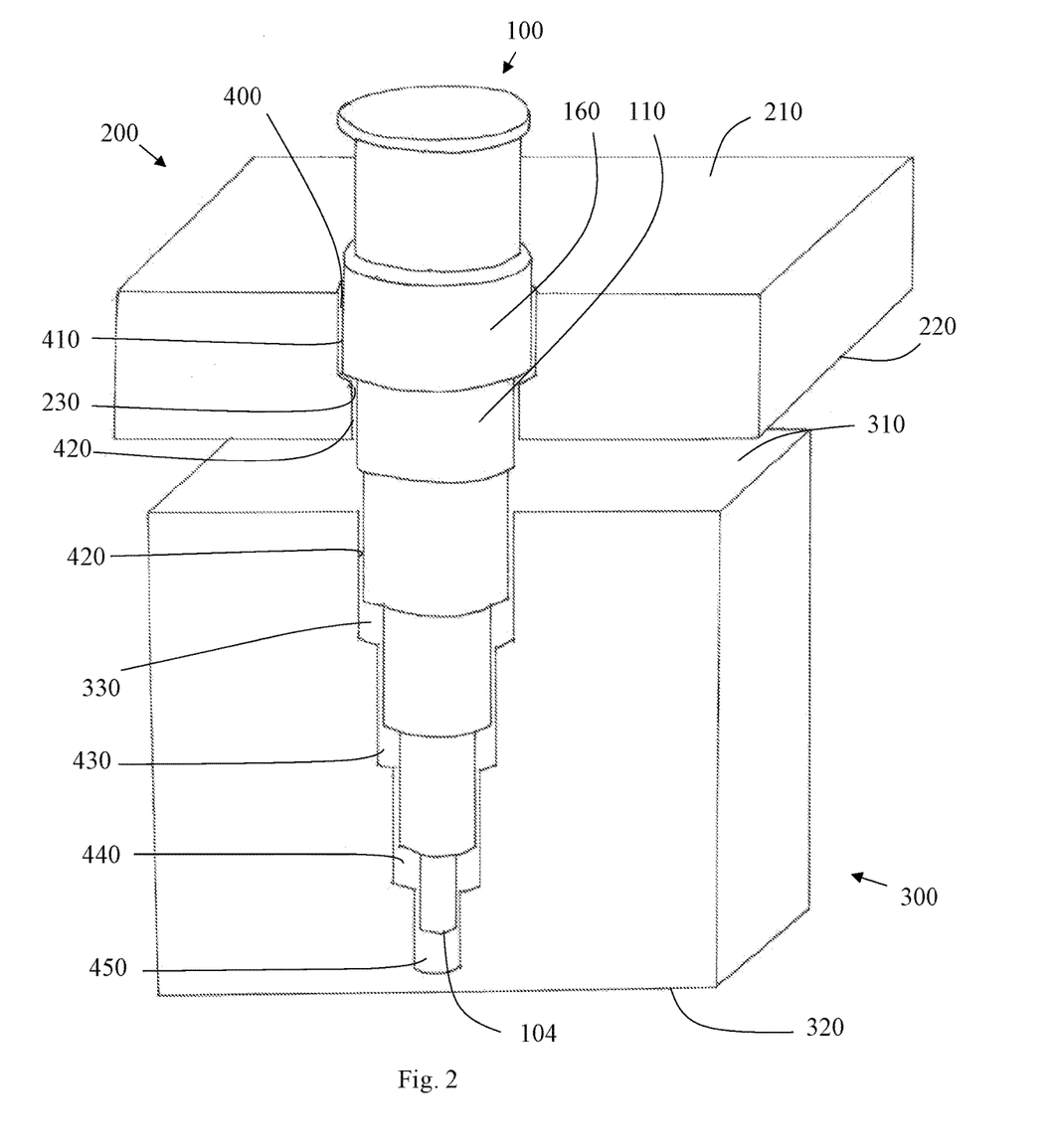
FIG. 2 shows a cross-sectional side view of a guidance apparatus being used to align a ceiling member being deposited onto a wall panel.
Figure 3:
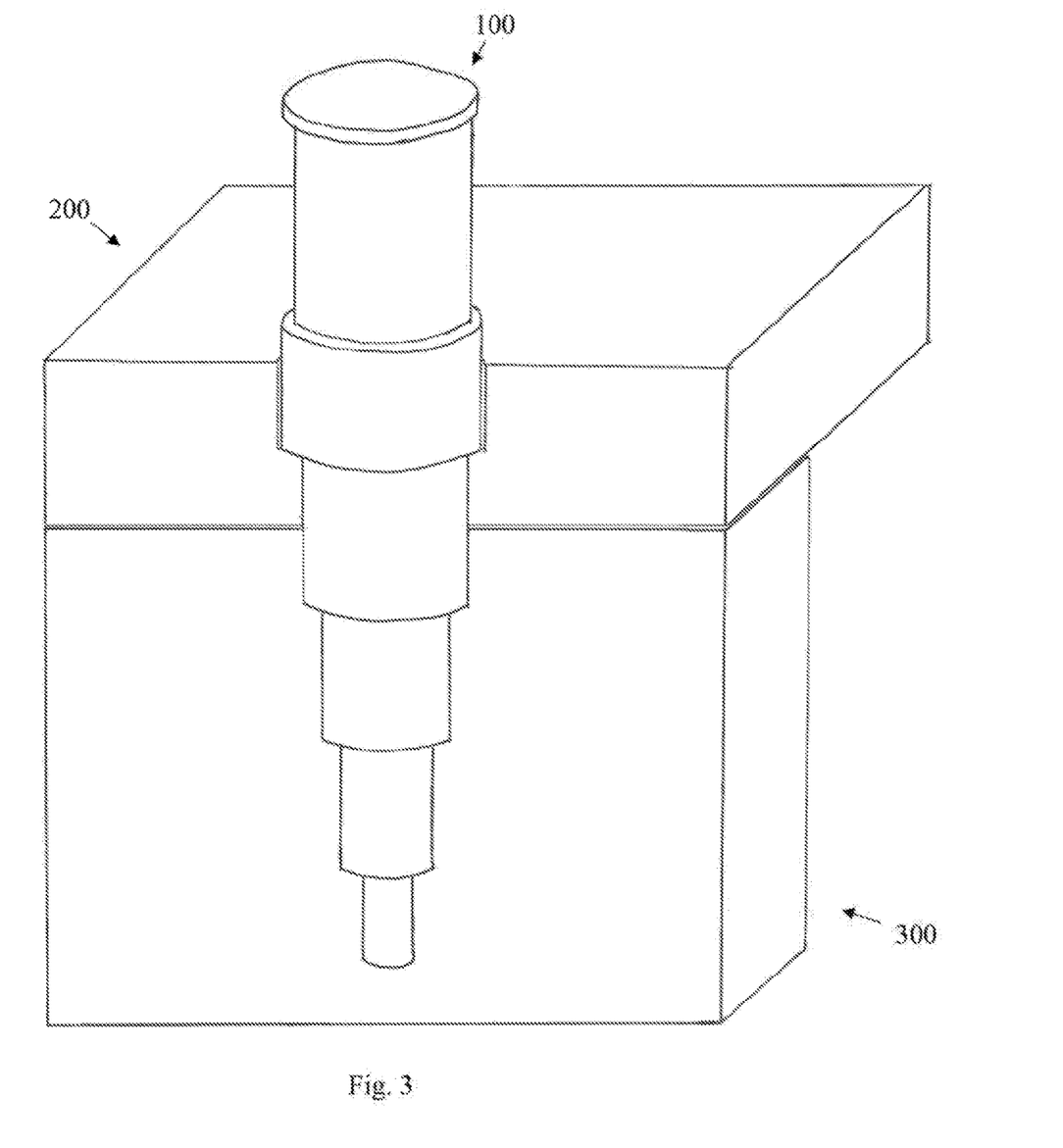
FIG. 3 shows a cross-sectional view of a stepped dowel fastening the ceiling member and wall panel together, after the guidance member has been used to align the ceiling member and wall panel, to define a dowel-receiving cavity, and been removed.

As shown in FIGS. 1-3, the embodiments of the invention include an apparatus for guiding certain adjacent assembly components into alignment with respect to each other, to position the assembly components into the positions they adopt when the assembly system is in the assembled configuration. The guidance apparatus aligns certain structures in adjacent assembly components to create another structure for accepting a fastening mechanism to join the components together. After being guided into the predetermined assembly configuration, the guiding apparatus can be removed, leaving the aligned assembly components in the aligned, predetermined configuration suitable for accepting fastening mechanisms to secure the assembly components to each other in the aligned, predetermined configuration.

Embodiments of the invention are meant to accommodate assembly systems including assembly components having certain features suitable for joining multiple assembly components; in particular, components having at least one depression or opening on a side or exterior surface, such as shown in FIG. 2.

As shown in FIG. 2, a first assembly component 200 can have a top surface 210, opposed bottom surface 220, with a central portion between the top and bottom surfaces. The first assembly component can also have a passageway 230 extending between the top and bottom surfaces, with openings in the top and bottom surfaces. A second assembly component 300 can have a top surface 310, opposed bottom surface 320, with a central portion between the top and bottom surfaces. At least one depression or bore 330 can be located on the top surface 310 of the second assembly component 300, extending into an interior portion of the second assembly component 300. When the first and second assembly components are aligned in a predetermined configuration, the first assembly component channel or passageway 230 can communicate with the second component bore or depression 330 to define a cavity 400 suitable for receiving a fastening mechanism. In preferred embodiments, the aligned cavity can possess a size and shape suitable for accepting or engaging a stepped dowel.

The aligned, dowel-receiving cavity 400 (created by the alignment of the first and second assembly components 200, 300) can possess a series of cavity sections, including a first cavity section 410 having the largest circumference or perimeter, and each successive cavity section 420, 430, 440, 450 having a smaller circumference or perimeter than the preceding section. When viewed in profile, such an aligned, dowel-receiving cavity has a shape that is stepped or terraced, having a base or entry portion that is wider or larger than the tip portion on the opposite side.

The dowel-receiving cavity 400, formed by the alignment of the first and second assembly components 200, 300. The dowel-receiving cavity 400 can have a plurality of cavity sections, a first section 410, middle sections 420, 430, 440, and a last section 450. In a preferred embodiment, the dowel-receiving cavity has two middle section, but other embodiments can have no middle section, one middle section, or three or more middle sections. The first and last sections 410, 450 can have side boundaries and end boundaries, respectively. Each of the middle sections 420, 430, 440 can have side boundaries and step boundaries, respectively. Each of the cavity sections are preferably contiguous to another neighboring section. The side boundaries define a cross-sectional size for their respective sections. In a preferred embodiment, the cross-sectional size of the side boundaries decreases as one progresses from the first section 410 to the last section 450 in a series of steps. The cross-sectional size of the side boundaries can be any suitable size. The length of each individual cavity section can vary considerably.

The dowel-receiving cavity 400 is arranged in the assembly system at a non-perpendicular angle, at a transverse or acute angle, relative to the surface of the top end of the assembly system. Pairs of dowel-receiving cavity can be set in the top end so to define lines or paths that extend toward each other. Each of the dowel-receiving cavity in pairs of dowel-receiving cavity can extend toward a longitudinal axis of the assembly system, or toward a longitudinal axis set between the bores. The pairs of bores can define angles with respect to the top end surface that are between 0-90°, and it is preferred that the acute angles be between 30-60° or between 40-50°.

To accommodate a stepped dowel 100, the corresponding dowel-receiving cavity 400 can include a cavity made of sections 410, 420, 430, 440, 450, such that the first cavity section 410, defines a cavity having the largest circumference or perimeter and each successive section defining a cavity with a smaller circumference or perimeter than the preceding section. The negative space defined by the dowel-receiving cavity 400 can have a stepped or terraced shape or profile of a size and shape to accept a stepped dowel 100.

In the dowel-receiving cavity 400, the bore can include the first cavity section 410 of the dowel-receiving cavity 400, such first cavity section 410 configured to engage a collar member to be described in more detailed later.

Where the assembly system is a wall panel system, the first and second assembly components 200, 300 can be, for example, a ceiling member 200 and a wall panel 300. As an example, certain wall systems are composed of multiple wall panels. Individual panels can have a size or weight too great for an individual to manipulate easily, either alone or with the help of others, as can multi-panel wall assembly systems. Such wall panels can include depressions or bores in their tops, bottoms, or sides, the bores capable of being engaged by fastening mechanisms to secure the wall panel to another wall system component, such as a floor member or a ceiling member.

The wall panel assembly can include a series of wall panels arranged beside each other in a row, with a longitudinally extending horizontal ceiling member and a corresponding floor member affixing the top and bottom ends of the wall panels in place between them. Each wall panel can have a vertical length that is substantially greater than its horizontal height, defining an elongated member or element. The sides of adjacent wall panels can communicate with each other, and the adjacent surfaces of the positioned wall panels can, when assembled together, define an outward-facing surface of the wall panel assembly.

Each wall panel or elongated member 300 includes a top end and an opposed bottom end, and has generally planar opposed first and second surfaces 310, 320 extending between the top and bottom ends, and first and second opposed side portions, such as shown in FIGS. 2-3. At least one exterior surface of the wall panel or elongated member 300, preferably its top end 310, can include one or more bores or depressions 330. Each bore can include an aperture on the surface of the wall panel, the aperture communicating with a passageway that extends inward from the surface into an interior portion of the wall panel 300. Preferably, the passageway terminates within the interior portion of the wall panel 300.

Each ceiling member 200 can include elongated first and second surfaces 210, 220. Each surface member can include one or more predrilled (or otherwise fashioned) holes or channels defining a passageway 230 extending between the first and second surfaces 210, 220 of the ceiling member 200. It is preferred that the channels be arranged at angles, preferably acute or transverse angles, with respect to the first and second surfaces, although the channels can also be placed at a substantially right angle with respect to the first and second surfaces.

When a surface member 200 is placed against a wall panel 300, such as shown in FIG. 3, it is preferred that each channel align with a corresponding bore so that the two structures aligned to together define a space or cavity suitably shaped for receiving a dowel. In some embodiments, the channel and bore can align to define a substantially straight or linear fastener-receiving path.

In preferred embodiments, the defined space or cavity 400 forms a space suitable for a stepped dowel. In such an aligned configuration, the components can be secured together with a fastening mechanism, such as a stepped dowel.

Embodiment: Guidance Apparatus

As shown in FIGS. 1-3, the guidance apparatus can comprise a stepped dowel member 100, as described in U.S. Pat. Nos. 7,856,933, and 10,005,586 which are incorporated herein by reference. Briefly, a stepped dowel 100 is made of multiple sections 110, 120, 130, 140, 150, the first section 110 having the largest circumference or perimeter and each successive section having a smaller circumference or perimeter than the preceding section. When viewed in profile, such a dowel has a shape that is stepped or terraced, having a base portion 102 that is wider or larger than the tip 104 portion on the opposite side.

The dowel 100 can have a plurality of dowel sections, a first section 110, middle sections 120, 130, 140, and a last section 150. In a preferred embodiment, the dowel has two middle section, but other embodiments can have no middle section, one middle section, or three or more middle sections. The first 110 and last dowel sections 150 can have side walls and end walls, respectively. Each of the middle sections 120, 130, 140 can have side walls and step walls, respectively. Each of the sections are preferably contiguous to another neighboring section. The sidewalls define a cross-sectional size for their respective sections. In a preferred embodiment, the cross-sectional size of the sidewalls decreases as one progresses from the first section to the last section in a series of steps. The cross-sectional size of the sidewalls can be any suitable size. The length of each individual dowel section can vary considerably. The dowel can have some sections or all sections that have grooves on their exterior surface. The dowel can have other configurations, such as, the dowel shown and described in U.S. Pat. No. 6,267,527, which is hereby incorporated by reference.

Preferably, the stepped dowel member 100 can fit into the dowel-receiving cavity 400 defined by the aligned bore 330 of a wall panel 300 and the channel 230 of a ceiling member 200 (or by the dowel-receiving cavity formed by two adjacent assembly components aligned into a predetermined assembled configuration). Preferably, the stepped dowel member 100 and the dowel-receiving cavity 400 form a loose fit between them. A loose fit between the stepped dowel member 100 and the dowel-receiving cavity 400 is preferred, so that the stepped dowel member 100 of the guidance apparatus can move easily and freely within the dowel-receiving cavity 400 and so that the tip portion 104 of the stepped dowel member 100 can be easily and freely guided to the terminus of the dowel-receiving cavity 400.

When the tip portion 104 is allowed to engage a wall panel component 300, in the absence of the floor or ceiling members, the tip portion 104 of the stepped dowel member 100 is of a size and shape so as to be insertable into a bore in the wall panel, such as shown in FIGS. 2 and 3. Preferably, the tip portion 104 has a relative size and shape smaller than the wall panel bore 330, so that the tip portion 104 can be readily inserted into the wall panel bore 330.

In some embodiments, the stepped dowel member 100 can include a sensor 170 for detecting when the bore 330 of a wall panel 300 and the channel 230 of a ceiling member 200 align sufficiently to define the dowel-receiving cavity 400. For example, the sensor 170 can be included on the tip portion 104 or the last dowel section 150 of the stepped dowel member 100. Such a sensor 170 can provide a signal to an individual using the guidance apparatus, upon detecting the change in physical space created by the alignment of the wall panel bore 330 and ceiling member channel 230, to communicate that the components have been aligned with respect to each other.

The dowel section surfaces can be smooth or textured. For example, the sidewall of one or more stepped dowel member dowel sections can include a thread on its outer surface. The dowel member thread can engage with a complimentary thread or groove on the side surface of a corresponding dowel-receiving cavity.

The guidance member comprises a collar member 160, the collar member surrounding a portion of the base portion 102 of the stepped dowel member 110. Preferably, the collar member 160 is proximate to the first section 110 of the stepped dowel member 100. Where the dowel sections of the stepped dowel member have cylindrical shapes, the collar member 160 can also have a cylindrical shape that encircles the base portion 102 of the stepped dowel member 100.

As shown in FIGS. 1A and 1B, the collar member 160 can have a sidewall that is of a similar shape of the sidewall of the first section 110 of the stepped dowel member 100. The cross-sectional size of the collar member 160 sidewall is larger than the cross-sectional size of the first section 110 of the stepped dowel member 100; the cross-sectional size of the collar member 160 sidewall is larger than the cross-sectional size of all of the sections of the stepped dowel member 100. The collar member 160 has an upper end surface 162 facing the base 102 of the stepped dowel member 100 and a lower end surface 164 facing the tip 104 of the stepped dowel member 100. The upper and lower end surfaces 162, 164 can define upper and lower apertures, respectively. The upper and lower apertures can provide passageways through which the stepped dowel member 100 can move.

In some embodiments, the upper aperture includes a flange 166 extending outward from the upper end surface 162. Such outward-extending flange 166 preferably has a diameter or perimeter larger than the diameter or perimeter of the dowel-receiving cavity 400, to limit the depth to which the guidance member can enter the dowel-receiving cavity 400. Thus, a portion of the guidance member can always remain protruding above the channel of the ceiling member 200, even when the guidance apparatus is fully engaged in aligning the wall panel 300 and ceiling member 200 into the predetermined aligned configuration. This feature prevents the loss of the guidance apparatus through the bore 230 of the ceiling member 200, as shown in FIG.

In some embodiments, the upper aperture includes a rim or flange extending inward from the upper end surface. Such rim or flange can limit the sliding movement of the collar member 160 relative to the stepped dowel member 100, such that the collar member 160 remains proximate to the first dowel section 110 (or the base portion) of the stepped dowel member 100.

In some embodiments, the collar member 160 can have a lower step wall facing the tip 104 of the stepped dowel member 100. Such flange can limit the sliding movement of the collar member 160 relative to the stepped dowel member 100, such that the collar member 160 remains proximate to a portion of the base portion 102 of the stepped dowel member 100 at all times.

The guidance apparatus can have a shape and profile similar to a stepped dowel 100, with the collar member 160 providing the first section 110 of the guidance apparatus's stepped dowel shape, the first dowel section 110 of the stepped dowel member 100 providing the second section of the guidance apparatus, the second dowel section of the stepped dowel member providing the third section of the guidance apparatus, and so on.

The collar member 160 can be attached to the stepped dowel member 100 so as to move in a sliding fashion along the base portion 102 of the stepped dowel member.

The stepped dowel member 100 and the collar member 160 can include structures for reversibly securing the collar member 160 to the stepped dowel member 100. For example, the outer surface of the sidewall of the first section of the stepped dowel member 100 can include a grooved path for engaging a projection extending from the inner surface of the collar member 160 sidewall. Such projection can engage the grooved path, so as to minimize or halt movement of the collar member 160 relative to the stepped dowel member 100. The projection can be disengaged from the grooved channel, thus allowing the collar member 160 to move with respect to the stepped dowel 100. As another example, the collar member 160 can be reversibly joined and unjoined to the stepped dowel member 100 by any commonly-used fastening mechanism, such as a thread, snap, or the like. Thus the collar member 160 can be unsecured to move relative to the stepped dowel portion or can be secured so as to be immobile relative to the stepped dowel portion, as desired.

In some embodiments, the collar member 160 and stepped dowel member 100 can be disposed so that the collar member 160 floats, slides, or moves with respect to the stepped dowel member 100, such as shown in FIGS. 1A-1B. The collar member 160 can travel along a longitudinal axis of the stepped dowel member 100 or along a longitudinal axis of the first section 110 of the stepped dowel member 100. Thus, the collar member 160 can move in direction substantially parallel to the longitudinal axis. In some embodiments, the collar member 160 can rotate around the stepped dowel member 100. In some embodiments, an inwardly-extending or outwardly-extending flange depending from the upper surface of the collar member 160 can provide a structure that prevents the collar member 160 from being disengaged from the stepped dowel member 100.

It is preferred that one or more dowel sections of the stepped dowel member 100 have a sidewall having a longitudinal length sufficient to span the distance two assembly components undergoing alignment by the guidance apparatus, when the assembly components approach each other. As shown in FIG. 2, for example, when aligning the assembly components, a first dowel section 110 and collar member 160 engage the bore 230 of the ceiling member 200, while an adjacent dowel section extends between the channel 230 of the ceiling member 200 and the bore 330 of the wall panel 300, providing a direct, straight line of connection between the two components. This direct and linear connection allows an individual to align the two assembly components with respect to each other along a first plane, and causes the channel and bore to align, so that the ceiling member 200 can be lowered onto the wall panel 300 to achieve alignment in a second plane (and allowing the channel and bore to communicate to define the dowel-receiving cavity). Although FIG. 2 shows one particular dowel section spanning the distance between the two assembly components, other dowel sections can provide for such primary and secondary alignment of the two assembly components with respect to each other.

The base portion 102 of the stepped dowel member 100 can include a structure or member for providing a grip for a manual tool. For example, the base portion 102 of the stepped dowel member 100 can include a loop or ring which can be grasped by a hook or an eyehook. As another example, the base portion 102 can include a protrusion that can be grasped by a manual tool such as pliers or fingers. Similarly, the collar member 160 can include a structure protruding from the top end of the collar member 160, extending away from the tip portion 104, providing a structure for manipulating or retrieving the guidance apparatus from aligned first and second assembly components (e.g., ceiling member 200 and wall panel 300), such as an internal bar located proximate to the upper aperture and extending away from the stepped dowel member 100.

Embodiment: Using the Guidance Apparatus

Typically, a wall panel 200 and ceiling member 300 are aligned into a predetermined aligned structure after the wall panel has been secured to or mounted upon a floor panel. As shown in FIGS. 2 and 3, the ceiling member 200 is typically lifted and then lowered onto the top surface 310 of the wall panel 300 or multi-panel wall system, the bottom surface 220 of the ceiling member 200 to interface with the top surface 310 of the wall panel 300.

Generally, the ceiling member 200 will be suspended by a crane or other mechanical device, transported to a location proximate to the desired predetermined configuration, and suspended over the wall panel 300. When the two assembly components are separated by a small enough distance to be spanned by the guidance apparatus, the guidance apparatus can be deployed. The engagement distance between the two assembly components can be a few inches, typically less 12 inches, less than 6 inches, or approximately 1-2 inches for certain ceiling member and wall panel combinations. In other assembly systems, the guidance apparatus can be used to span greater or smaller distances. For example, the engagement distance between the assembly components can be less than the length of the longest dowel section of the guidance apparatus.

By using the guidance apparatus while the weight of the ceiling member 200 is fully or partially supported by the crane, an individual trying to align the assembly components need exert relatively little force to move the ceiling member to a desired location with precision. An individual can easily move heavy and bulky components, either manually or with the use of another device. Once the ceiling member 200 is deposited onto the wall panel 300, the individual must use greater amounts of force to shift the position of the ceiling member with respect to the wall panel; in some situations, the ceiling member 200 can be too large or too heavy to be moved without assistance.

Before the bottom surface 220 of the ceiling member 200 and top surface 310 of the wall panel 300 contact each other, the guiding apparatus can be threaded through a channel defining a passageway 230 between the upper and lower surfaces 210, 220 of the ceiling member 200. The tip portion 104 can be threaded to pass through the channel. The dowel sections of the stepped dowel member 100 can pass through the passageway 230; the collar member 160 has a size or girth too large to allow the collar member to pass through the passageway 230. Instead, the channel can be configured to engage the collar member 160, thus preventing the guidance apparatus from completely passing through the channel 230. The bore can include the first cavity section 410 of the dowel-receiving cavity 400, such first cavity section 410 configured to engage the collar member 160.

After the collar member 160 engages the stepped channel 230, some or all of the dowel sections pass through the passageway.

As shown in FIG. 2, as the ceiling member 200 approaches the wall panel 300, the protruding tip portion 104 of the stepped dowel member 100 can be manipulated to engage the aperture of the stepped bore 330 of the wall panel 300. As stated above, a corresponding ceiling member channel 230 and wall member bore 330 can align to define a dowel-receiving cavity 400 configured to accept a stepped dowel 100.

Once engaged, as shown in FIG. 3, the tip portion 104 can slide or move along the side boundary of the bore 330, guiding the remainder of the guidance member further into the bore 330. It is preferred that the collar member 160 have a thickness or cross-section sufficient to fully engage or tightly communicate with a cavity section of the channel. The dowel section adjacent or proximate to the collar member 160 will have a thickness or cross-section smaller than that of the collar member 160. It is preferred that the cross-section of the adjacent dowel section be smaller than the openings of the channel and the bore, sufficiently smaller so that the adjacent dowel section can be readily passed through the openings. That is, a snug fit between the collar member 160 and the ceiling member 200 is desired, while a looser connection between the stepped dowel member 100 and the wall panel 300 is desired.

As the tip portion 104 of the guidance apparatus is guided to the terminus of the bore 330 (which is in the interior portion of the wall panel 300), the guidance apparatus can manipulate the assembly components so that the guidance apparatus fully engages the dowel-receiving cavity 400, by aligning the ceiling member 200 and the stepped dowel member 100 to be positioned together into the predetermined aligned positions relative to each other for the assembled wall system 300. Once aligned, the bore 330 and channel 230 can positioned to communicate with each other to define the fastener-receiving cavity 400, as shown in FIG. 2. Because most of the weight of the ceiling member 200 is supported by the crane at this point in time, the channel 230 and bore 330 can be manipulated to precisely align with each other, even where the ceiling member 200 possesses a large size or heavy weight.

When the guiding apparatus has aligned the ceiling member 200 and wall panel 300, the sidewall of the collar member 160 can communicate with the surface of a first section cavity 410 of the dowel-receiving cavity 400, with the first cavity section 410 being located within the ceiling member 200. The last dowel section 150 of the stepped dowel member 100 can communicate with the last cavity section 450 of the dowel-receiving cavity 400, with the last cavity section 450 being located within the wall panel 300. The cavity sections between the first and last cavity sections can be located within the ceiling panel 200, the wall panel 300, or a portion of each structure.

As shown in FIG. 2, where the channel 230 and the bore 330 are positioned at a right angle with respect to the upper and lower surfaces of the ceiling member 200 and the wall panel 300, the guiding apparatus can align the two components to achieve a dowel-receiving cavity 400 that is perpendicular to the two components. Such precise alignment of the dowel-receiving cavity 400 surfaces facilitates the subsequent placement of a fastening mechanism in a similarly precise vertical alignment perpendicular to the upper surfaces of the assembly components. This feature allows the fastening mechanism so that it is positioned along the longitudinal axis of the dowel-receiving cavity, such as shown in FIGS. 2-3.

In the dowel-receiving cavity 400, the bore can include the first cavity section 410 of the dowel-receiving cavity 400, such first cavity section 410 configured to engage the collar member 160.

Because of the stepped shape of the dowel 100, the dowel can be inserted into the bore with minimal force. Preferably, the collar member 160 is sized and shaped to snugly engage the ceiling member channel 230, while one or more of the stepped dowel sections are sized and shaped to loosely engage the bore 330 of the wall panel 300.

Where there is a plurality of corresponding bores and channels to be aligned, more than one guiding apparatus can be employed to align the ceiling member and the wall panels to the predetermined aligned configuration.

After the desired configuration or alignment is achieved, the guidance apparatus can be removed from the aligned components so that their relative alignment is retained or preserved. That is, the guidance apparatus can be removed from aligned components without disturbing the position of the aligned first and second components (e.g., ceiling member and wall panel).

The guidance apparatus, or its components, can be constructed of plastic, metal or any other type of material that will provide for proper operation of the guidance apparatus. The guidance apparatus can also be constructed of a combination of two or more materials. For example, the guidance apparatus can be constructed of wood and contain a metal post or insert that runs longitudinally axially through it from base to tip. One embodiment of the guidance apparatus can be constructed of a metallic material or metal alloy, such as, for example, hardened steel, stainless steel or titanium.

Specific embodiments of a guidance apparatus for an assembly system according to the present invention have been described for the purpose of illustrating the manner in which the invention can be made and used. It should be understood that the implementation of other variations and modifications of this invention and its different aspects will be apparent to one skilled in the art, and that this invention is not limited by the specific embodiments described. Features described in one embodiment can be implemented in other embodiments. It is understood to encompass the present invention and any and all modifications, variations, or equivalents that fall within the spirit and scope of the basic underlying principles disclosed and claimed herein.

What is claimed is:

1. A system for guiding first and second assembly components into an assembled configuration, the system comprising:
   a first assembly component and a second assembly component; and
   a guidance apparatus including:
      a dowel member having: a base portion; a tip portion; and a plurality of dowel sections, each successive dowel section having a cross-section smaller than a cross-section of a preceding dowel section, and
      a collar member, the collar member disposed around and slidingly engaging the base portion of the dowel member;
   wherein the first assembly component includes a channel and the second assembly component includes a bore, such that when the first assembly component and the second assembly component are aligned in the assembled configuration, the channel and the bore define a dowel-receiving cavity configured for receiving the dowel member; and
   wherein the first assembly component and the second assembly component are positioned into a predetermined configuration by engaging: i) the collar member to the channel of the first assembly component and ii) the dowel member to the bore of the second assembly component, and
   wherein a portion of the collar member protrudes above the first assembly component when a bottommost surface of the collar member abuts a horizontal surface within the channel of the first assembly component.

2. The guidance apparatus of claim 1, the collar member comprising a flange, the flange having a cross-section greater than a cross-section of the collar member.

3. The guidance apparatus of claim 1, the base portion of the dowel member comprising a member for providing a grip for a manual tool.

4. The guidance apparatus of claim 1, wherein the dowel-receiving cavity includes a plurality of cavity sections, each successive cavity section having a cross-section smaller than a cross-section of a preceding cavity section.

5. The guidance apparatus of claim 4, the collar member engages a first cavity section in the first assembly component, and the dowel sections engage the cavity sections in the second assembly component.

6. The guidance apparatus of claim 4, wherein:
   the dowel-receiving cavity comprises four cavity sections; and
   the dowel member comprises three dowel sections.

7. The guidance apparatus of claim 4, wherein:
   the dowel-receiving cavity consists of four cavity sections; and
   the dowel member consists of three dowel sections.

8. The guidance apparatus of claim 1, wherein the guidance apparatus comprises a metallic material.

9. The guidance apparatus of claim 1, wherein the dowel member comprises a metallic material.

10. The system of claim 1, wherein:
    the first assembly component comprises a ceiling member; and
    the second assembly component comprises a wall panel.

11. A system for guiding first and second assembly components into a predetermined configuration, the system comprising:
    a first assembly component and a second assembly component; and
    a guidance apparatus including:
       a stepped dowel member having a plurality of dowel sections, each successive dowel section having a cross-section smaller than a cross-section of a preceding dowel section, and
       a collar member surrounding and slidingly engaging a first dowel section;
    wherein each assembly component includes a stepped opening, such that when the first assembly component and the second assembly component are positioned in an assembled configuration, the aligned stepped openings define a cavity for receiving a stepped dowel; and
    wherein the first assembly component and the second assembly component are positioned into the assembled configuration by the stepped dowel member passing through the stepped opening of the first assembly component and into the stepped opening of the second assembly component, such that the collar member engages the first assembly component stepped opening and the stepped dowel member engages the second assembly component stepped opening.

12. The guidance apparatus of claim 11, the stepped dowel member comprising a sensor.

13. A guidance apparatus for guiding first and second assembly components into an assembled configuration, the guidance apparatus comprising:
    a dowel member having: a base portion; a tip portion; and a plurality of dowel sections, each successive dowel section having a cross-section smaller than a cross-section of a preceding dowel section, and
    a collar member disposed around and slidingly engaging at least one of the plurality of dowel sections,
    wherein the collar member is prevented from sliding in a direction toward the base portion of the dowel member when an upper end surface of the collar member abuts a bottommost surface of the base portion, the upper end surface being an upmost surface of the collar member.

* * * * *